(12) United States Patent
Massa et al.

(10) Patent No.: US 12,513,805 B2
(45) Date of Patent: Dec. 30, 2025

(54) SYSTEM OF LIGHTS FOR AUTOMATIC COMPLIANCE WITH REGULATORY STANDARDS ASSURANCE

(71) Applicant: HiViz Lighting, Inc., Hendersonville, NC (US)

(72) Inventors: Samuel T. Massa, Hendersonville, NC (US); Jesse Whitaker McRae, Hendersonville, NC (US)

(73) Assignee: HiViz Lighting, Inc., Hendersonville, NC (US)

( * ) Notice: Subject to any disclaimer, the term of this patent is extended or adjusted under 35 U.S.C. 154(b) by 0 days.

(21) Appl. No.: 18/641,955

(22) Filed: Apr. 22, 2024

(65) Prior Publication Data

US 2025/0331087 A1 Oct. 23, 2025

(51) Int. Cl.
| | |
|---|---|
| *H05B 47/17* | (2020.01) |
| *B60Q 1/26* | (2006.01) |
| *H05B 47/105* | (2020.01) |
| *H05B 47/175* | (2020.01) |

(52) U.S. Cl.
CPC ......... *H05B 47/172* (2024.01); *B60Q 1/2611* (2013.01); *H05B 47/105* (2020.01); *H05B 47/1975* (2024.01); *B60Q 2900/50* (2022.05)

(58) Field of Classification Search
CPC ............ B60Q 1/2611; B60Q 2900/50; H05B 47/172; H05B 47/105; H05B 47/1975
See application file for complete search history.

(56) References Cited

U.S. PATENT DOCUMENTS

| | | | | |
|---|---|---|---|---|
| 2013/0093324 A1* | 4/2013 | Brown | ................... | B60Q 1/247 315/77 |
| 2016/0037613 A1* | 2/2016 | Laherty | ................... | H05B 47/19 315/294 |
| 2016/0129833 A1* | 5/2016 | Ford | ................... | B60Q 1/2611 29/401.1 |
| 2021/0078487 A1* | 3/2021 | Bader | ................... | B60Q 1/52 |
| 2023/0339386 A1* | 10/2023 | Massa | ................... | B60Q 1/14 |
| 2023/0339419 A1* | 10/2023 | Massa | ................... | B60Q 1/14 |

FOREIGN PATENT DOCUMENTS

KR        100962554 B1 * 6/2010 ............ B60Q 11/00

* cited by examiner

*Primary Examiner* — Raymond R Chai
(74) *Attorney, Agent, or Firm* — CHRISTENSEN O'CONNOR JOHNSON KINDNESS PLLC (57) ABSTRACT

A lighting system for an emergency vehicle, the lighting system including one or more light sources, and a processor, where the processor is configured to receive one or more compliance data from each light source of the one or more light sources, receive one or more location data from each light source of the one or more light sources, compare the compliance data and the location data with a compliance standard, determine a compliance minimum and a compliance maximum for one or more characteristics for each light source of the one or more light source, and adjust the one or more characteristics of each light source of the plurality of light sources based on one or more user commands, wherein each light source of the plurality of light sources operates at or above the compliance minimum and at or below the compliance maximum for each light source.

20 Claims, 7 Drawing Sheets

SYSTEM OF LIGHTS FOR AUTOMATIC COMPLIANCE WITH REGULATORY STANDARDS ASSURANCE

BACKGROUND

On emergency vehicles, such as fire trucks, emergency hazard warning lights are installed both on and around the vehicle. These lights are intended to increase conspicuity and alert traffic to the presence of a hazard or the need to yield right of way when an emergency vehicle is responding. The lights installed are regulated only by a number of national best practice consensus standards, which by themselves, don't carry the weight of law, but by nature of their widespread adoption, often are used as defacto expectation in many civil court cases involving emergency vehicle collisions. By and large, emergency vehicle manufacturers require all customers to purchase vehicles which are either compliant with these standards or sign an acknowledgement of the deviation and an explicit assumption of liability.

One such standard is the National Fire Protection Association (NFPA) regulations. Example regulations include NFPA 1901, which is used to regulate the manufacturing and design of structural firefighting apparatus, NFPA 1917 which regulates automotive ambulances, NFPA 414 which regulates airport rescue firefighting vehicles, and NFPA 1916 which regulates automotive woodland vehicles. All of these standards have recently been rolled up into a new standard which becomes known as NFPA 1900.

In the standard, things such as color, flash rate, peak beam intensity, and beam intensity over time (known as Candela Seconds per Minute) are regulated attributes. The NFPA standards point to other Society of Automotive Engineer's (SAE) standards. The NFPA standard regulates the vehicle, while the SAE standards regulate light fixtures specifically.

In the NFPA standards, the apparatus is broken into 4 circumferential zones: A, B, C, and D, and 2 subsidiary zones (upper and lower). For each zone, there are certain combinations of colors which are permissible or forbidden, sometimes correlated against a certain response mode. For instance, while responding, white light is permitted towards the front. Once on-scene (activated by the emergency break), white lights must shut off while facing forward (known as "zone A")

Traditionally, each manufacturer has individual fixtures tested by a photometry lab which provides the raw data that can be used in combination with the layout of the apparatus to ensure compliance of the system of fixtures which are intended to be used. Because every apparatus is different, every system must be individually tested for compliance and evaluated based on the configuration of the apparatus, the lights, and the sub-modules inside of the lights. The fire apparatus manufacturers often do not have the expertise to evaluate the system compliance themselves, and generally rely on the lighting manufacturers to tell them whether or not their systems are "compliant" with the NFPA standards.

Colors are regulated by the NFPA standard, then by local states. Further, the intensity of each fixture is measured, often while in a steady burning state. The light fixture's intensity may be measured along a variety of 3 dimensional planes which are used to indicate the beam width and shape. These planes are generally based on a goniophotometer measurement where the light is placed perpendicular on a rotating machine, then angled left/right ("h" plane) in finite degree increments. Then the light fixture is angled up/right plane ("V" plane) in finite increments. Each measurement is plotted on a chart, which tells the intensity in any given angle, while steady burning. There are 19 H-V datapoints which are significant in determining compliance of a fixture, and then of a system. The fixtures individually are validated and considered compliant, the data from the group of fixtures which are intended to be used in the system are added up to see if the total value is at (or above) the threshold. Further, Warning lights are intended to flash. The duty cycle of the flashing light is critical in meeting the photometric requirements set forth in the standard. Each flash pattern has periods of "on" and "off". When the on periods are a longer proportion of the flash pattern than the off, the light emits more energy. When the off periods are longer than the on, it emits less. The standards specify how much flash energy is required per zone. As such, the photometric energy of a steady burning light can be divided by the duty cycle to determine the number of candela seconds per minute for any given flash pattern. Each pattern is unique and should be validated to ensure accuracy with the mathematical results indicated.

Additionally, the NFPA standards have a minimum intensity, but no maximum intensity currently. As such, many fixtures or systems far exceed the minimum system photometry requirements. At night, these oversized systems which are sometimes significantly brighter than the minimum requirements can overpower oncoming traffic and make it difficult to see the responders on or around the scene.

A common request by apparatus purchasers is to reduce the intensity of the lights on the apparatus. A second set of photometric data points can be produced when the fixtures are configured in a "dim" mode, which can be used to evaluate system compliance when it's nighttime. This is commonly omitted due to the complexity and time it takes to compliance each system. If a fixture is measured at 100% intensity and the user wants to use it at anything other than 100% intensity, a second set of datapoints must be gathered to ensure compliance for any mode other than the original.

Each of these features of the lighting system needs to be compliant with the relevant regulatory standards. However, light patterns, colors, and intensities often need to be adjusted depending on the situation, time of time, location, or the like. Manual adjustment by emergency responders, who may not be familiar with these regulations risk putting the emergency light fixtures into a non-compliant brightness, pattern, or color.

Accordingly, systems for testing and automatically adjusting emergency light fixtures to ensure compliance are needed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Disclosed herein is a system for ensuring compliance for one or more emergency light fixtures to ensure compliance with regulatory standards. Instead of manually creating photometric reports for every system and each setting, this technology includes a distributed network of light fixtures which are pre-loaded with their configuration's measured photometric data. As the system boots, the system checks how many light fixtures are in the system and each light fixture's photometric data. During a system initialization, each light fixture is assigned a zone and sub zone (A/B/C/D, upper/lower). This data is then communicated across all fixtures during boot up so that the system can compare commands to the system against the allowable photometric data. In some embodiments, the system is configured to know what rules it needs to follow, know what intensities and zones are going to be measured, and then each light fixture reports back to the network (such as through a (controller area network) CAN, (local interconnect network) LIN bus, or Bluetooth), each light fixture's individual characteristics. In this manner, each light fixture monitors how bright the light fixture is at a variety of intensities, which the system can evaluate and determine whether to execute or reject such a light fixture configuration due to noncompliance.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Disclosed herein is a method of determining and automatically adjusting to comply with local and/or federal regulations, standards, and/or laws for emergency vehicles. In some embodiments, a lighting system including independent "smart" warning lights communicate amongst themselves to comply with both user commands and applicable regulations, either by limiting the commands available to a user, or by adjusting their compliant flash patterns, colors, brightness levels, and the like to scale with selectable user inputs. In this manner, any adjustment made by a user to one or more characteristics of the warning lights remains compliant with local regulations and/or best practices.

Figure 1A:
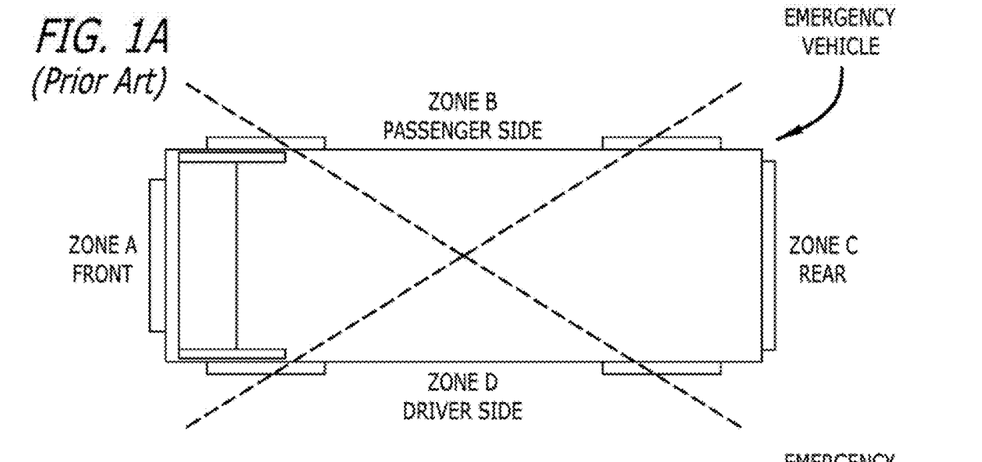
FIG. 1A is a view showing representative zones of an emergency vehicle, in accordance with the present technology.

FIG. 1A is a view showing representative zones of an emergency vehicle, in accordance with the present technology. According to the National Fire Protection Association (NFPA), emergency vehicle lighting systems may be divided into four zones: Zone A, Zone B, Zone C, and Zone D. Zone A is the front side of the emergency vehicle, Zone B is a passenger side of the emergency vehicle, Zone C is a rear side of the emergency vehicle, and Zone D is a driver side of the emergency vehicle.

Each Zone of the four Zones have specific and distinct compliance requirements, based on both NFPA regulations and other local and state-wide regulations for emergency vehicles. Each Zone may require a particular brightness, intensity, color, or the like of each light source in the Zone.

Figure 1B:
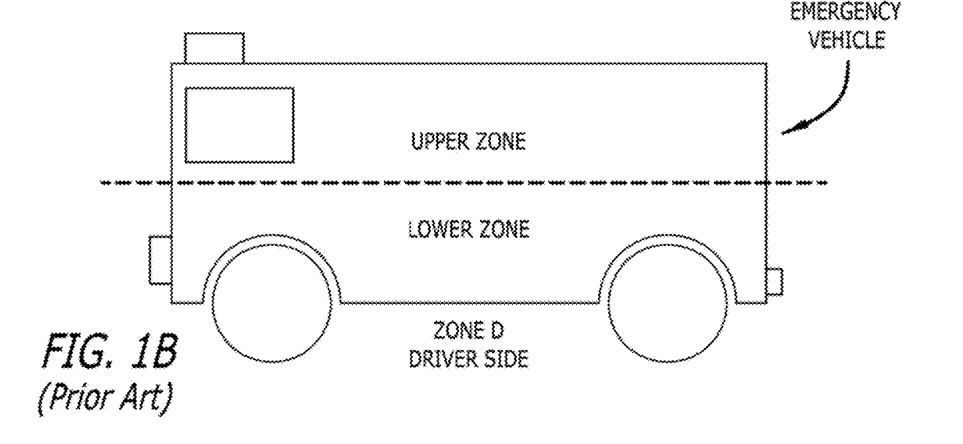
FIG. 1B is a driver side view of an emergency vehicle, in accordance with the present technology.
Figure 1C:
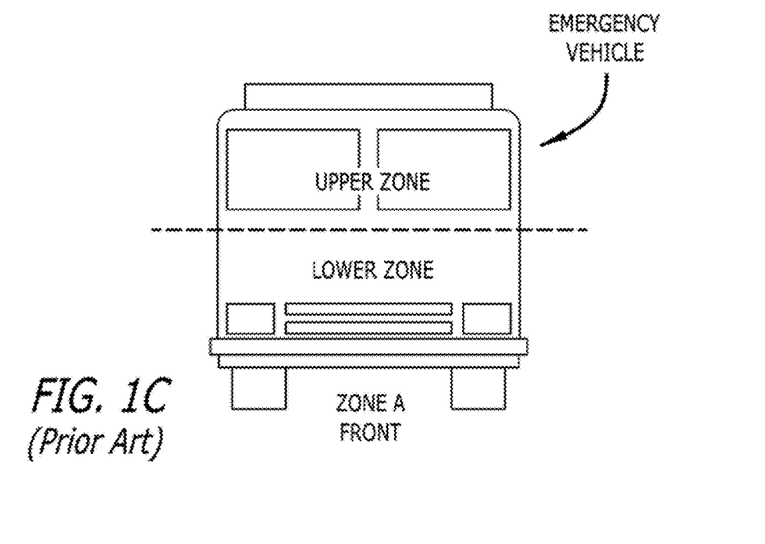
FIG. 1C is a frontside view of an emergency vehicle, in accordance with the present technology.

FIG. 1B is a driver side view of an emergency vehicle, in accordance with the present technology. FIG. 1C is a frontside view of an emergency vehicle, in accordance with the present technology. Each Zone of the four Zones may be divided into sub-zones, based on the governing regulations (such as NFPA, or state level regulations). For example, each Zone may be divided into an upper zone and a lower zone. The upper zone and the lower zone may be located at a halfway point on the side of the emergency vehicle. While FIGS. 1B-1C shows only Zone D and Zone A divided into upper and lower zones, it should be understood that any zone may also be divided into sub-zones.

Figure 2:
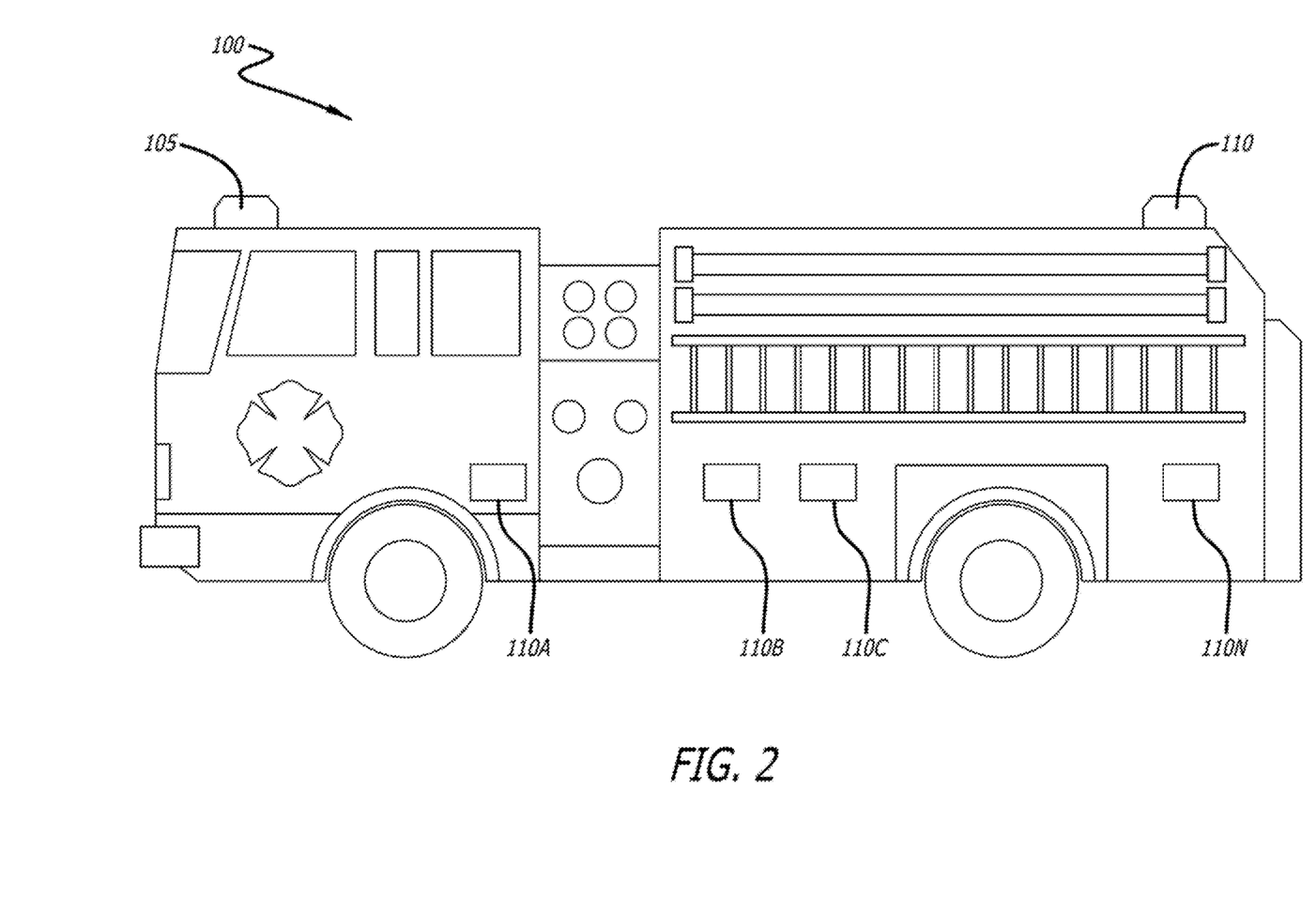
FIG. 2 is an example lighting system, in accordance with the present technology.

FIG. 2 is an example lighting system 100, in accordance with the present technology. In some embodiments, the lighting system 100 includes one or more light sources. For example, the lighting system may include a light bar 105, one or more warning lights 110A, 110B, 110C . . . 110N, and a rear light bar 110. It should be understood that the light bar 105, the one or more warning lights 110A, 110B, 110C . . . 110N, and the rear light bar 110 (collectively "one or more light sources") are merely a representative illustration of the one or more light sources. One skilled in the art will understand that any amount and/or location of light sources may be included in the lighting system 100.

In some embodiments, the lighting system 100 may be initially configured. In such initial configuration, one or more users can select colors, flash patterns, modes, speeds, and a variety of other information related to the functions of the one or more light sources. The lighting system 100 will only allow the execution of user inputs which fall into the compliance requirements (such as a minimum compliance and/or a maximum compliance of one or more characteristics) of each light source. The user can command any intensity desired, but the lighting system 100 may prevent the one or more light sources to operate outside of the allowable perimeters (i.e., above the compliance maximum or under the compliance minimum). For example, a user may select 0% to 100% intensity, where 0% represents the allowable "minimum" intensity, 10% represents 10% of the allowable intensity, and 100% represents the maximum intensity of the one or more light sources.

If the lighting system 100 changes, that is, if light sources are added or removed to the lighting system 100, a minimum compliance and/or maximum compliance for each light source may be adjusted. For example, if a light source was removed, the minimum compliance may be raised and/or scaled based on the latest available data reported from the one or more light sources in the system.

Figure 3:
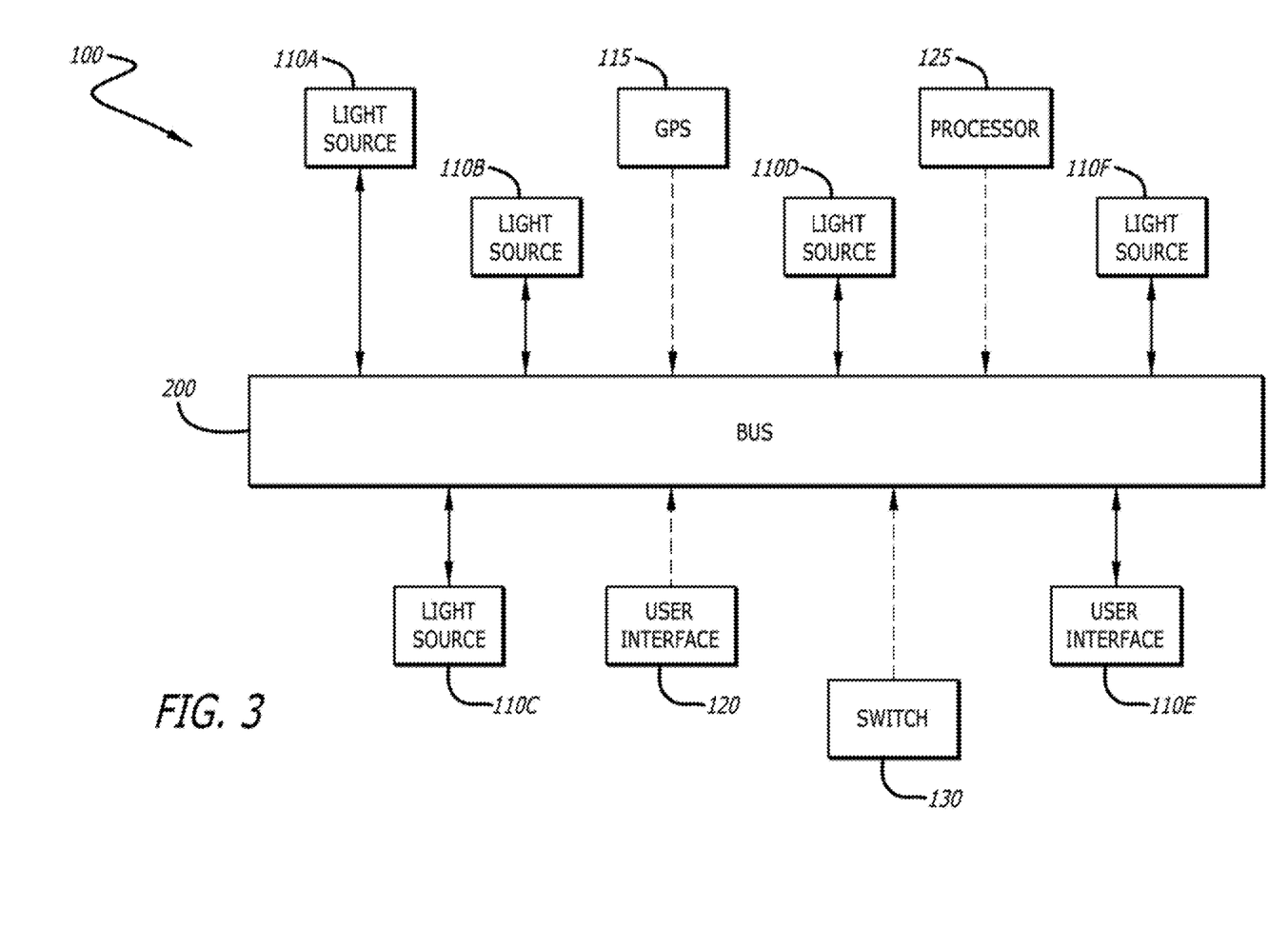
FIG. 3 is an example lighting system, in accordance with the present technology.

FIG. 3 is an example lighting system 100, in accordance with the present technology. In some embodiments, the lighting system 100 is a distributed network of smart light sources (collectively, "one or more light sources") 110A, 110B, 110C, 110D, 110E, 110F. While six light sources are shown, it should be understood that the lighting system 100 includes any number of light sources, including a single light source.

In some embodiments, the system 100 further includes a processor 125, a user interface 120, a global positioning sensor (GPS) 115, and/or a switch 130. Each of these components may communicate with the one or more light sources 110A, 110B, 110C, 110D, 110E, 110F with a shared bus 200. Each light source of the one or more light sources 110A, 110B, 110C, 110D, 110E, 110F may comprise a separate microprocessor, configured to transmit compliance data and/or local data of the light source to the bus 200 (and eventually the processor 125), and receive commands to adjust the one or more characteristics of the light source.

In some embodiments, the system includes a user interface 120. In some embodiments, the user interface 120 is configured to accept one or more user commands as inputs. In some embodiments, the user interface 120 is a touchscreen. The user interface 120 may be located on a dashboard of an emergency vehicle, on a personal mobile device, on a computer, or the like. In some embodiments, the user interface 120 is configured to display one or more user selections (as shown and described in FIGS. 4A-4C).

In some embodiments, the lighting system 100 uses a distributed network of one or more light sources. In some embodiments, the one or more light sources are "smart," that is, each includes a microcontroller that allows each light source to "know" what color light the light source is emitting, what the light source's intensity is, the location (and/or zone or sub-zone) of the light source, and the photometry associated with the output of the light source.

In some embodiments, the one or more light sources 110A, 110B, 110C, 110D, 110E, 110F can determine and transmit location data. In some embodiments, location data includes a zone (such as Zones A, B, C, and/or D in FIG. 1A) and/or a sub-zone (such as Upper and/or Lower as shown in FIGS. 1B-1C) of the emergency vehicle that each light source is located.

In some embodiments, the one or more light sources 110A, 110B, 110C, 110D, 110E, 110F can also determine and transmit compliance data. In some embodiments, compliance data include a brightness range, a duty cycle, a number of light sources in the same zone, a color, and any other attributes which are required by the standard they are being tested for compliance against. In some embodiments, compliance data includes a color range, a brightness range, an intensity range, an operating mode data, or a combination thereof. Once all that data is known and shared, the fixtures may respond to user commands for speed, intensity, color, and flash pattern only based on what is compliant based on the rules.

In some embodiments, a distributed network of light sources 110A, 110B, 110C, 110D, 110E, 110F all report and share data amongst themselves so that the light sources 110A, 110B, 110C, 110D, 110E, 110F can analyze their own statuses (or "characteristics") as the relates to other light sources in the system. In some embodiments, each light source in a same zone is in communication with one another. In some embodiments, each light source of the lighting system is in communication with one another. Accordingly, when a user command includes various intensities, the light sources 110A, 110B, 110C, 110D, 110E, 110F "know" the minimum compliance for each zone, the flash patterns of their neighboring (or adjacent) light sources, and how many light sources are contributing to the light in that zone. The system may then allow intensity values which, as a system, are considered compliant.

In operation, the processor 200 is configured to receive one or more compliance data from each light source of the one or more light sources, receive one or more location data from each light source of the one or more light sources, compare the compliance data and the location data with a compliance standard, determine a compliance minimum and/or a compliance maximum for one or more characteristics for each light source of the one or more light source, and adjust the one or more characteristics of each light source of the plurality of light sources based on one or more user commands, wherein each light source of the plurality of light sources operates at or above the compliance minimum and/or at or below the compliance maximum for each light source. In some embodiments, the processor 200 is further configured to determine a compliance list, where the compliance list corresponds to a characteristic of the one or more characteristics for each light source, and restricting user selections based on the compliance list.

In some embodiments, the one or more characteristics includes a brightness, a color, an intensity, a flash pattern, and operating mode, or a combination thereof. Where a characteristic of the one or more characteristics involves a range (such as brightness, speed, or intensity), a compliance minimum and/or compliance maximum may be determined based on the compliance standard. Where a characteristic of the one or more characteristics involves discrete states (such as color, operating mode, or flash pattern), a compliance list may be determined. In some embodiments, the compliance list includes a list of modes, colors, flash patterns, or the like that are considered compliant.

For example, the light source may be configured to emit white, amber, green, red, and blue light. In such embodiments, based on a location of the vehicle and/or a location (and/or zone or sub-zone) of the light source, the lighting system 100 may compile a compliance list of colors that are considered compliant. For example, if a state regulation prohibits red lights in Zone B, red would be removed from the compliance list. In some embodiments, the processor 200 may allow for user selections that correspond to the compliance list. The user interface 120 may display the user selections as selectable buttons. In such embodiments, the user interface may either not display red as a selectable button or "gray out" or otherwise prevent a user from selecting red while the emergency vehicle is located in that state and/or while the light source is located in Zone B.

A characteristic may have a range of acceptable compliance. In such embodiments, the lighting system 100 can determine a minimum compliance. In some embodiments, the lighting system 100 may also determine a maximum compliance. For example, a compliance standard (such as a NFPA regulation or state regulation) may determine a minimum brightness level for a light source. In such embodiments, the selectable buttons may be a sliding scale, a percentage, or another spectrum-based graphical representation. In some embodiments, the user may "scrub" a selectable button along a scale, select a level or percentage, and/or increase or decrease a level with one or more buttons to command the lighting system 100. In some embodiments, the user interface 120 may scale the selectable button so that a minimum level selectable by a user corresponds to the compliance minimum. In other embodiments, the selectable button may be "grayed out", missing, and/or locked so that a user cannot adjust the brightness to below the minimum compliance.

In one example, if a light source stops responding or is removed from the system 100, and the system 100 was being commanded at is dimmest permissible setting (at a minimum compliance), the lighting system 100 can detect a missing and/or inoperable light and automatically adjust the brightness of all light sources to compensate for the missing and/or inoperable light source to continue to ensure compliance.

In another example, the GPS 115 can determine a location (geo-locate) the emergency vehicle. If the vehicle is in a state, city, or county which has specific regulations, such as laws or regulations governing emergency vehicle colors, flash patterns, or other regulations, the lighting system 100 can implement these regulations as compliance minimums, compliance maximums, and/or compliance rules, based on geography.

Figure 4A:
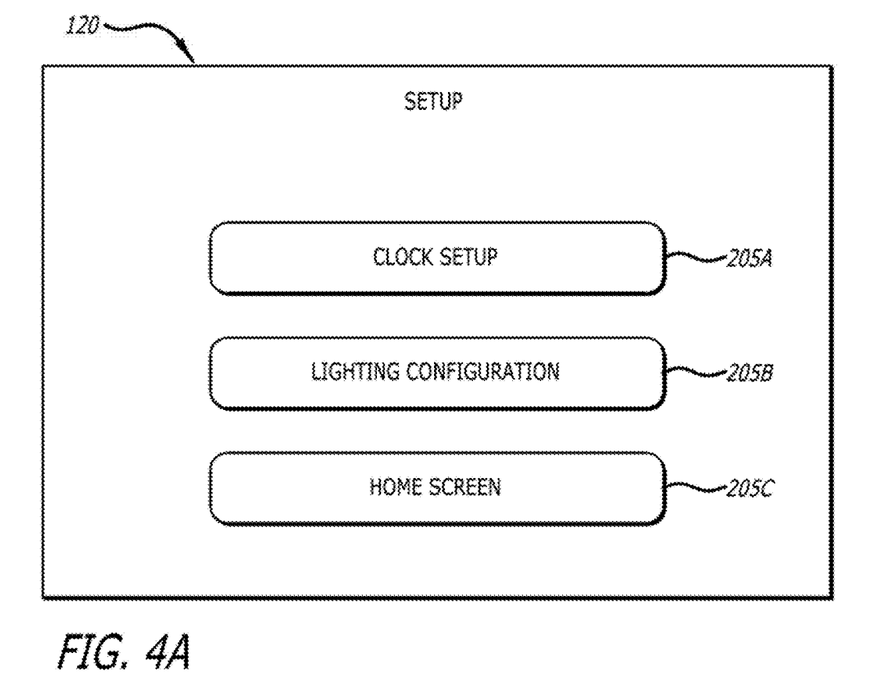
FIGS. 4A-4C are example user interface displays, in accordance with the present technology.
Figure 4B:
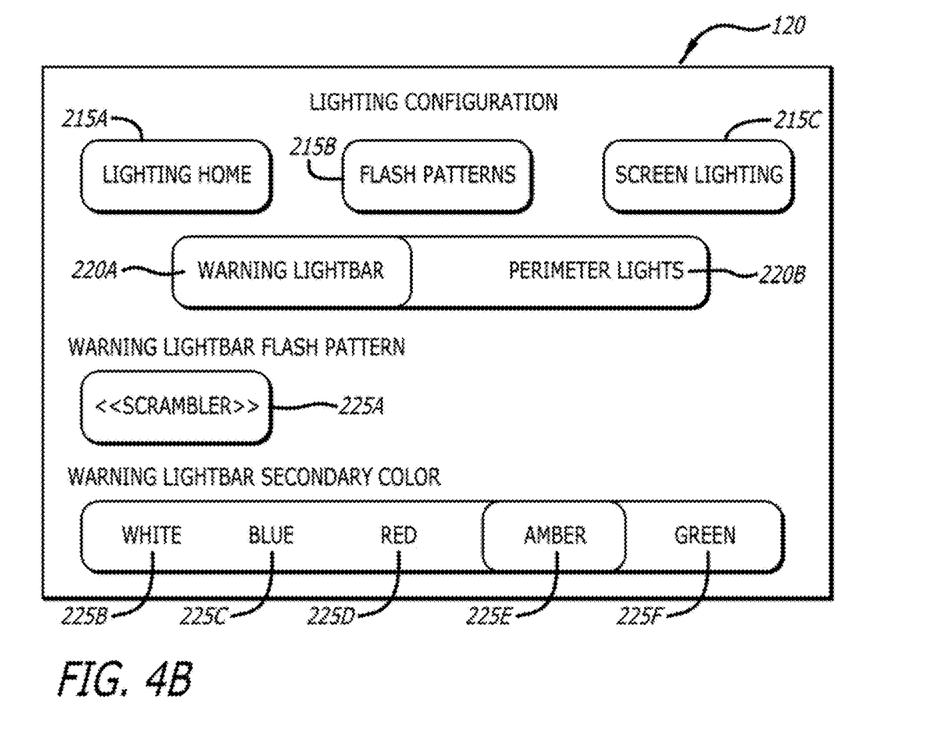
Figure 4C:
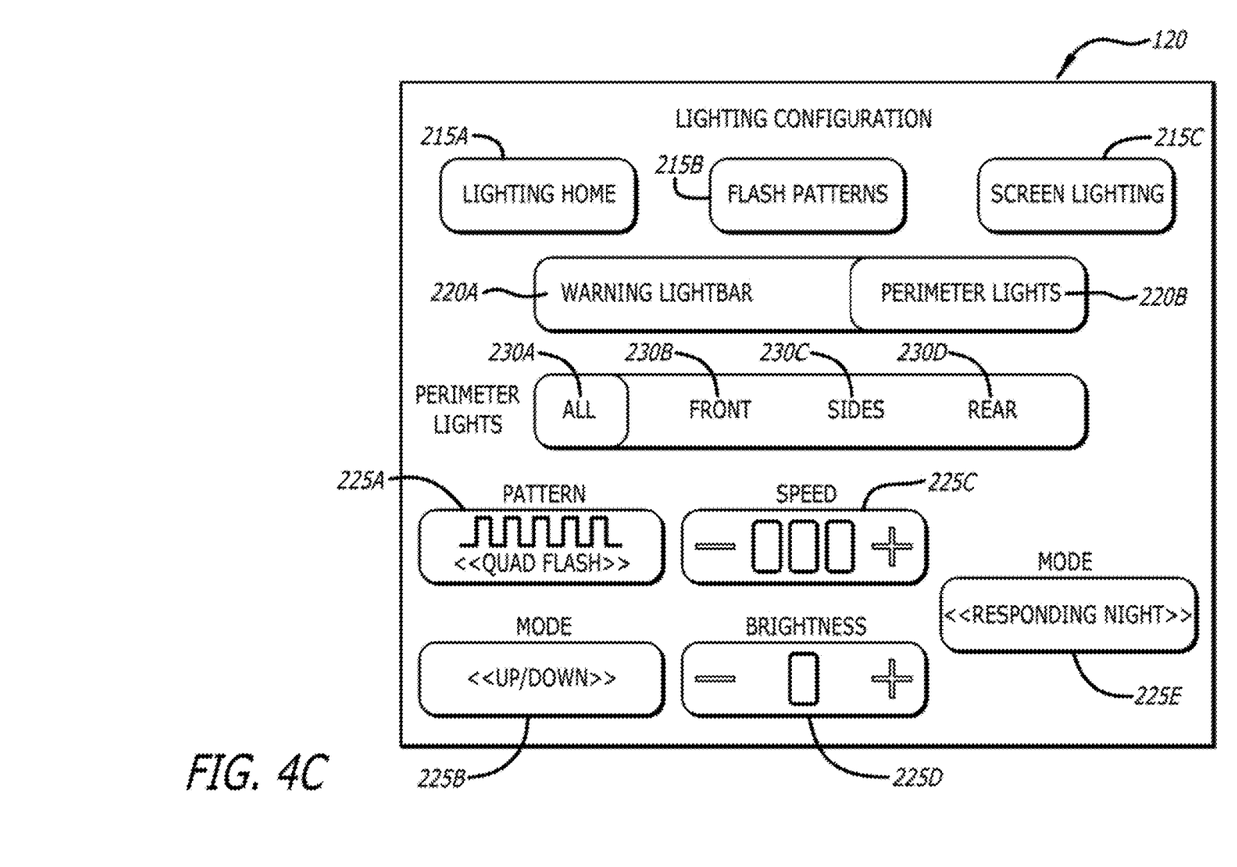

FIGS. 4A-4C are example user interfaces 120, in accordance with the present technology. In some embodiments, the user interface 120 displays a number of selectable buttons 225A, 225B, 225C . . . 225N corresponding to user selections that correspond to either a compliance list or a compliance minimum (as described herein).

FIG. 4A is an example setup display of a user interface 120 of a lighting system (such as lighting system 100). In some embodiments, the setup display includes multiple buttons for configuring a setup of an emergency vehicle. For example, as shown in FIG. 4A, included in the setup display is a clock setup button 205A, a lighting configuration button 205B, and a home screen button 205C. In some embodiments, the user interface 120 is a touchscreen. In some embodiments, the user interface 120 is on a dashboard of an emergency vehicle, on a mobile device, or the like.

In some embodiments, selecting the clock setup button 205A allows a user to adjust a clock of the emergency vehicle. Selecting the home screen button 205C May allow a user to return to a home screen of the user interface. The lighting configuration button 205B may allow the user to navigate to a lighting configuration page, as shown in FIG. 4A. It should be understood that the user interface 120 of FIG. 4A should not be considered limiting. Any number of buttons may be on the setup display, in any order, and in any style.

FIG. 4B is an example lighting configuration display of the user interface 120. In some embodiments, the lighting configuration display is accessed by selecting the lighting configuration button 205B as shown in FIG. 4A. In some embodiments, the lighting configuration display includes a lighting home button 215A, a flash pattern button 215B, and a scene lighting button 215C. These buttons 215A, 215B, 215C may navigate to additional displays of the user interface 120.

In some embodiments, the lighting configuration display further includes a light selection bar including a warning light bar 220A and perimeter lights 220B. In some embodiments, the warning light bar may be light bar 105 as shown in FIG. 2. In some embodiments, the perimeter lights may be warning lights 110A, 110B, 110C . . . 110N in FIG. 2. In some embodiments, the light selection bar may include any number of groupings of lights. As shown in FIG. 4B, the warning lightbar has been selected.

In some embodiments, the lighting configuration display further includes one or more selectable buttons 225A, 225B, 225C, 225D, 225E, 225F corresponding to either a compliance minimum or a compliance list for each characteristic of the one or more characteristics of the one or more light sources. In some embodiments, characteristics having compliance lists (such as color and flash pattern) may be displayed in any number of formats.

In one example, a characteristic with a compliance list (e.g., flash pattern) may be represented as a drop-down menu. Warning light bar flash pattern selectable button 225A may be configured to select a flash pattern. In some embodiments, the warning light bar flash pattern selectable button 225A is based on a compliance list for flash pattern. In some embodiments, warning light bar flash pattern selectable button 225A is a drop-down menu. In some embodiments, only flash patterns on the compliance list are selectable from the drop-down menu. In other embodiments, all flash patterns possible may be included in the drop-down menu, but flash patterns not on the compliance list are not selectable.

In some embodiments, there may be discrete selectable buttons for every option on the compliance list. For example, color, which is a characteristic that could have either a spectrum of options or a discrete set of options, has a compliance list determined for it by the processor. Accordingly, the system may prevent or allow a user to select a discrete number of colors based on the compliance standard. Shown in FIG. 4B is a white selectable button 225A, a blue selectable button 225B, a red selectable button 225C, an amber selectable button 225D, and a green selectable button 225F. In some embodiments, each option on the compliance list is represented as a discrete selectable button. The amber selectable button 225F is shown as selected in FIG. 4B. In some embodiments, one or more of the selectable buttons 225B, 225C, 225D, 225E, 225F may be omitted because the option is not on the compliance list. In some embodiments, one or more of the selectable buttons 225B, 225C, 225D, 225E, 225F may be "grayed out" or rendered un-selectable because the option is not on the compliance list.

FIG. 4C shows a lighting configuration display for perimeter lights. In some embodiments, perimeter lights are warning lights 110A, 110B, 110C . . . 110N. It should be understood that "perimeter lights" is just an example grouping of light sources of the one or more light sources. As shown in FIG. 4C, perimeter lights 220A have been selected.

In some embodiments, the one or more light sources may be grouped (such as into "perimeter lights" and "warning lightbar"), and then further grouped into sub-groups (such as front 230B, sides 230C, and rear 230D). In some embodiments, an all lights button 230A includes all sub-groups of the perimeter lights group. As shown in FIG. 4C, the all lights button 230A has been selected.

In some embodiments, multiple characteristics of the one or more characteristics may be adjusted for a group and/or sub-group of the one or more light sources of the lighting system. In some embodiments, each of the characteristics of the one or more characteristics has a corresponding selectable button 225A, 225B, 225C, 225D, 225E.

In some embodiments, the characteristic may have a compliance list associated with it, such as in the case of flash pattern, light mode, and operating mode, as explained herein. For example, pattern selectable button 225A, light mode selectable button 225B, and operating mode selectable button 225E may be drop-down menus including each option on a compliance list for each characteristic. As used herein, an operating mode may include a responding at night mode, a responding in day mode, a scene light in day mode, and a scene light in night mode. In each mode, different compliance lists may be generated. In some embodiments, the operating mode further informs compliance minimums of other characteristics (such as brightness and/or speed).

In some embodiments, a compliance minimum is determined for a characteristic that has a spectrum of options (such as speed and brightness). In such embodiments, a compliance minimum and/or a compliance maximum may be determined based on the compliance standard and/or one or more other characteristics. In some embodiments, the compliance minimum may determine a minimum user selection for the system. For example, brightness selectable button 225D is at the minimum user selection. In some embodiments, the minimum user selection corresponds to the compliance minimum. In other embodiments, a user may be prevented from a user selection (or selectable button) that is below the minimum compliance. For example, if a light source is configured to emit light at a speed lower than the compliance minimum, a user may be prevented from selecting a speed below the compliance minimum.

In some embodiments, the user interface 120 is configured to display one or more user selections. In some embodiments, the user interface 120 is further configured to render the one or more user selections representative of a characteristic of a light source that is not at or above the compliance minimum for each light source as unselect-able. In some embodiments, the processor (such as processor 125) is further configured to adjust one or more user selections based on the compliance minimum and the compliance maximum for each light source of the one or more light sources, where the user interface is further configured to display the user selections as one or more selectable buttons, where every selectable button is representative of a level that is at or above the compliance minimum for each light source.

In some embodiments, the compliance standard includes a National Fire Protection Association (NFPA) regulation. In some embodiments, the compliance standard includes state, city, and/or county regulations.

It should be understood that FIGS. 4A-4C are merely representative. The user interface 120 may take any aesthetic form. In some embodiments, different user selections and/or selectable buttons may be arranged in different ways, on different displays, or even omitted.

Figure 5:
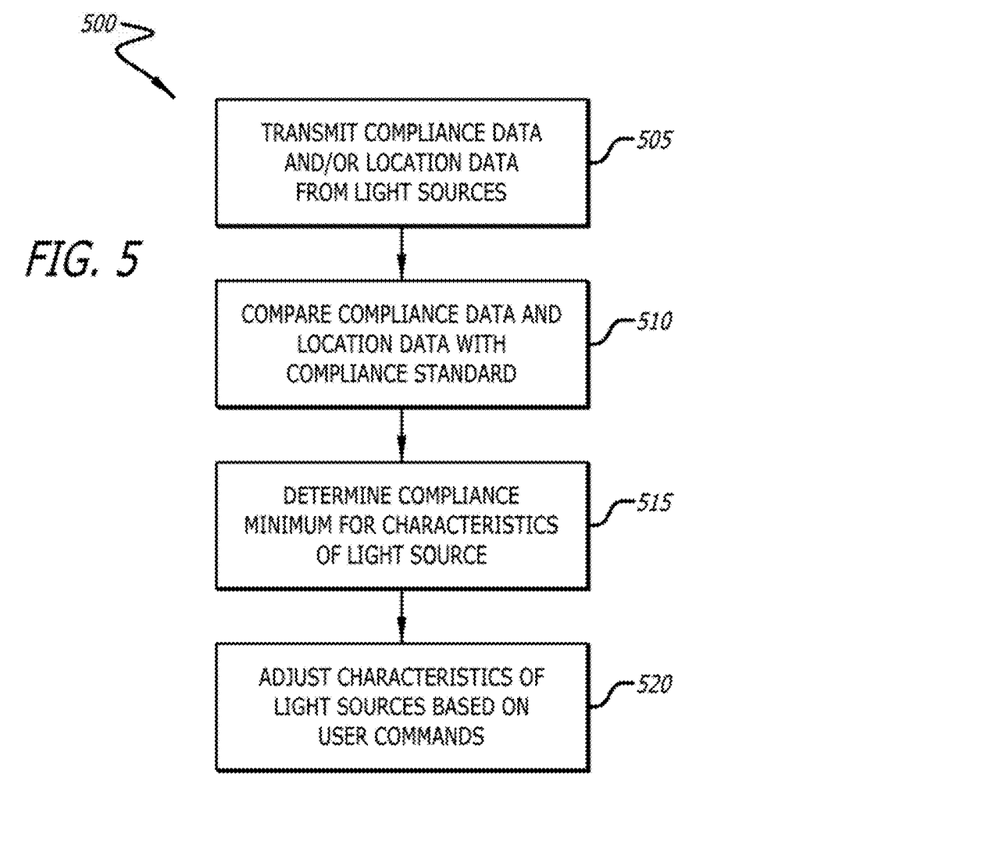
FIG. 5 is an example method of operating a lighting system, in accordance with the present technology.

FIG. 5 is an example method 500 of operating a lighting system, in accordance with the present technology. The method 500 may be carried out with a lighting system (such as lighting system 100). In some embodiments, the lighting system includes one or more light sources (such as light sources 110A, 110B, 110C, 110D, 110E, 110F), a GPS (such as GPS 115), a user interface (such as user interface 120), a processor (such as processor 125), and/or a bus (such as bus 200).

In block 505, compliance and/or location data is transmitted to the bus (and eventually the processor) of the lighting system. In some embodiments, the compliance and/or location data may also be transmitted to one or more adjacent light sources of the one or more light sources. In some embodiments, the compliance data includes a brightness range, an intensity range, a flash pattern data, an operating mode data, an intensity range, or a combination thereof. In some embodiments, the location data includes comprises a zone of an emergency vehicle where each light source of the plurality of light sources is located and/or a sub-zone of the emergency vehicle where each light source of the plurality of light sources is located.

In block 510, compliance data and location data are compared with a compliance standard. In some embodiments, the compliance standard is one or more National Fire Protection Association (NFPA) regulations. In some embodiments, the compliance standard includes a state regulation, city regulation, and/or county regulation.

In block 515, a compliance minimum is determined for one or more characteristics of the one or more light sources. In some embodiments, the compliance minimum is determined for a group of light sources (as explained in FIG. 4C). In some embodiments, the compliance minimum is for a brightness of the one or more light sources, a speed of the one or more light sources, and/or an intensity of the one or more light sources. In some embodiments, in addition to, or in the alternative, a compliance list may be determined for one or more characteristics of the one or more light sources. For example, a compliance list may be determined for a light pattern, a color, and/or an operating mode of the one or more light sources. In some embodiments, determining the compliance minimum includes comparing the standard to other lights in the system (such as warning lights). For example, if the standard requires 100 units of light, and a first warning light contributes 50 units of light, the first warning light may communicate with the other warning lights in the same zone to determine the zone minimum. If the zone has only two warning lights, then the first warning light determines that its light cannot be dimmed and remain complaint. If the zone has four warning lights, it can be determined that if all four warning lights contribute 50 units of light, all four warning lights are at two times the minimum compliance. In such a case, the first warning light (or all four warning lights in the zone) may dim up to 50% and still remain compliant.

In block 520, the one or more characteristics of the one or more light sources may be adjusted based on user commands. In some embodiments, user commands are accepted by a user interface, as explained in FIG. 6.

Figure 6:
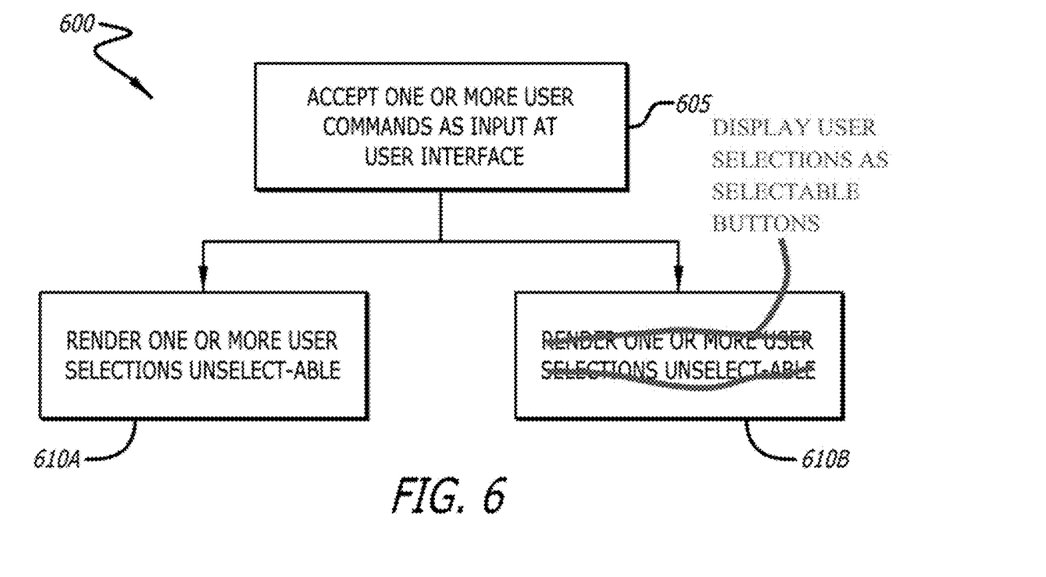
FIG. 6 is another example method of operating a lighting system, in accordance with the present technology.

FIG. 6 is another example method of operating a lighting system, in accordance with the present technology. The method 600 may be carried out with a lighting system (such as lighting system 100). In some embodiments, the lighting system includes one or more light sources (such as light sources 110A, 110B, 110C, 110D, 110E, 110F), a GPS (such as GPS 115), a user interface (such as user interface 120), a processor (such as processor 125), and/or a bus (such as bus 200).

In block 605, one or more user commands are accepted as input at the user interface. In some embodiments, the user interface may restrict one or more user commands via different mechanisms.

In block 610A, user selections are rendered un-selectable by the user interface. In such embodiments, the selections may be omitted from the user interface. In some embodiments, the selections are displayed, but not selectable by a user.

In block 610B, user selections are displayed as selectable buttons, as shown in FIGS. 4A-4C.

Figure 7:
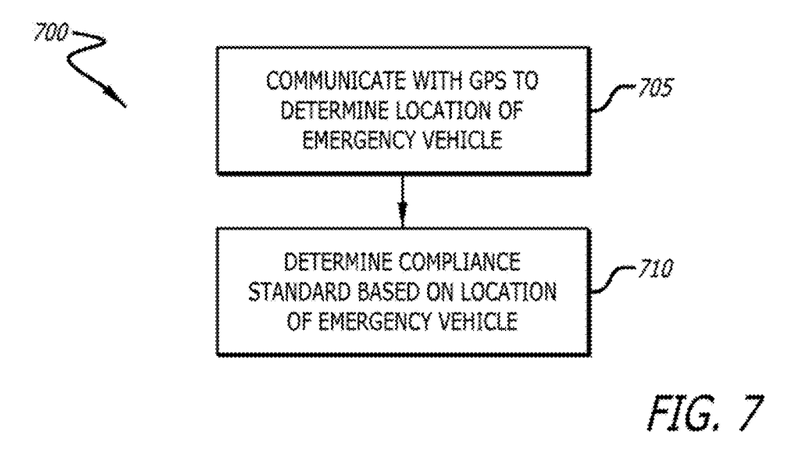
FIG. 7 is another example method of operating a lighting system, in accordance with the present technology.

FIG. 7 is another example method of operating a lighting system, in accordance with the present technology. The method 700 may be carried out with a lighting system (such as lighting system 100). In some embodiments, the lighting system includes one or more light sources (such as light sources 110A, 110B, 110C, 110D, 110E, 110F), a GPS (such as GPS 115), a user interface (such as user interface 120), a processor (such as processor 125), and/or a bus (such as bus 200).

In block 705, the GPS determines a location of the emergency vehicle and transmits it to the processor.

In block 710, the compliance standard is determined based on the location of the emergency vehicle. For example, if the emergency vehicle crosses a state line, the compliance standard may be changed from the first state's regulations to the second state's regulations. In this manner, the lighting system can update compliance standards in real-time as the emergency vehicle moves between states, counties, cities, and the like.

Figure 8:
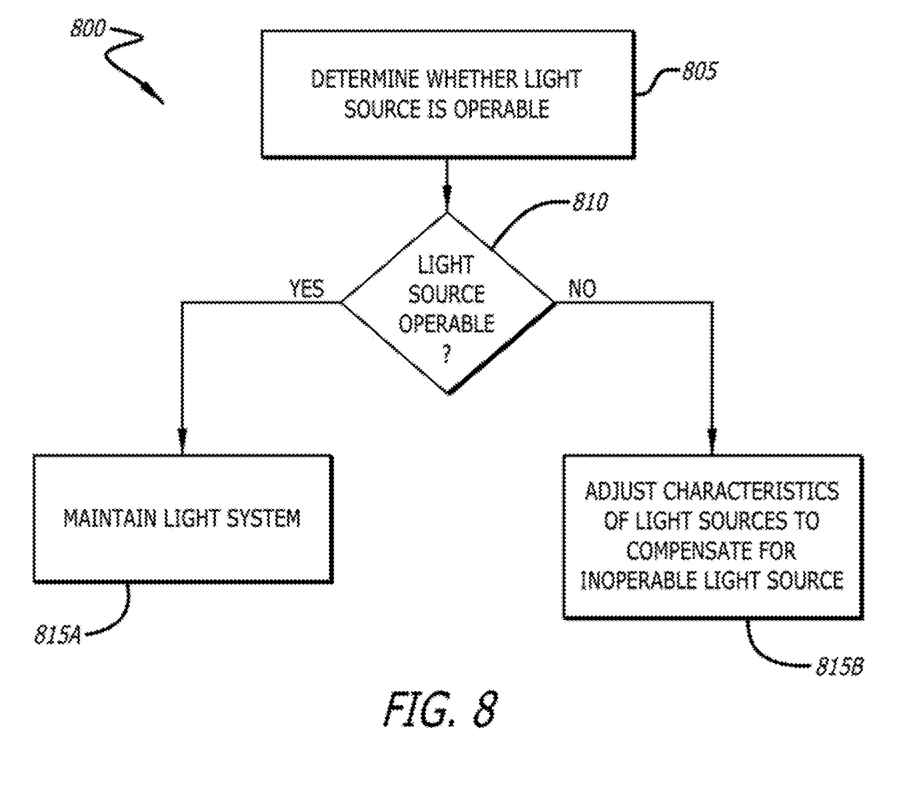
FIG. 8 is yet another example method of operating a lighting system, in accordance with the present technology.

FIG. 8 is yet another example method of operating a lighting system, in accordance with the present technology. The method 800 may be carried out with a lighting system (such as lighting system 100). In some embodiments, the lighting system includes one or more light sources (such as light sources 110A, 110B, 110C, 110D, 110E, 110F), a GPS (such as GPS 115), a user interface (such as user interface 120), a processor (such as processor 125), and/or a bus (such as bus 200).

In block 805, it is determined whether a light source is operable. In some embodiments, a light source is inoperable if it is broken, if it is not communicating with the lighting system, and/or the light source is removed from the system. The method 800 then proceeds to decision block 810.

At decision block 810, is all light sources of the one or more light sources are determined operable, the method 800 proceeds to block 815A.

In block 815A, the lighting system maintain one or more characteristics of the one or more light sources.

Returning to decision block 810, is one or more light sources is determined inoperable, the method 800 proceeds to block 815B.

In block 815B, one or more characteristics of the remaining light sources is adjusted to compensate for the inoperable light source. For example, if before the light source was removed or rendered inoperable, the system was operating at the minimum compliance for brightness, the brightness of the remaining light sources may be increased when the light source is removed or otherwise inoperable.

It should be understood that all methods 500, 600, 700, and 800 should be interpreted as merely representative. In some embodiments, process blocks of all methods 500, 600, 700, and 800 may be performed simultaneously, sequentially, in a different order, or even omitted, without departing from the scope of this disclosure.

While illustrative embodiments have been illustrated and described, it will be appreciated that various changes can be made therein without departing from the spirit and scope of the invention.

The present application may reference quantities and numbers. Unless specifically stated, such quantities and numbers are not to be considered restrictive, but representative of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

Embodiments disclosed herein may utilize circuitry in order to implement technologies and methodologies described herein, operatively connect two or more components, generate information, determine operation conditions, control an appliance, device, or method, and/or the like. Circuitry of any type can be used. In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

An embodiment includes one or more data stores that, for example, store instructions or data. Non-limiting examples of one or more data stores include volatile memory (e.g., Random Access memory (RAM), Dynamic Random Access memory (DRAM), or the like), non-volatile memory (e.g., Read-Only memory (ROM), Electrically Erasable Programmable Read-Only memory (EEPROM), Compact Disc Read-Only memory (CD-ROM), or the like), persistent memory, or the like. Further non-limiting examples of one or more data stores include Erasable Programmable Read-Only memory (EPROM), flash memory, or the like. The one or more data stores can be connected to, for example, one or more computing devices by one or more instructions, data, or power buses.

In an embodiment, circuitry includes a computer-readable media drive or memory slot configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as any form of flash memory, magnetic tape, floppy disk, a hard disk drive, a Compact Disc (CD), a Digital Video Disk (DVD), Blu-Ray Disc, a digital tape, a computer memory, or the like, as well as transmission type medium such as a digital and/or an analog communication medium (e.g., a fiber optic cable, a waveguide, a wired communications link, a wireless communication link (e.g., transmitter, receiver, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A lighting system for a vehicle having emergency hazard lights, the lighting system comprising:
   one or more light sources; and
   a processor, wherein the processor is configured to:
      receive one or more compliance data from each light source of the one or more light sources,
      receive one or more location data from each light source of the one or more light sources,
      compare the compliance data and the location data with a compliance standard,
      determine a compliance list, wherein the compliance list corresponds to a characteristic of the one or more characteristics for each light source, and
      restrict user selections based on the compliance list.

2. The lighting of claim 1, wherein the processor is further configured to:
   determine a compliance minimum for one or more characteristics for each light source of the one or more light source, and
   adjust the one or more characteristics of each light source of the plurality of light sources based on one or more user commands, wherein each light source of the plurality of light sources operates at or above the compliance minimum for each light source.

3. The lighting system of claim 1, wherein the system further comprises a user interface, wherein the user interface is configured to accept the one or more user commands as inputs.

4. The lighting system of claim 3, wherein the user interface is a touchscreen.

5. The lighting system of claim 3, wherein the user interface is configured to display one or more user selections.

6. The lighting system of claim 5, wherein the user interface is further configured to:
   render the one or more user selections representative of a characteristic of a light source that is not at or above the compliance minimum for each light source as unselectable.

7. The lighting system of claim 5, wherein:
   the processor is further configured to:
      adjust one or more user selections based on the compliance minimum for each light source of the one or more light sources; and
   wherein the user interface is further configured to:
      display the user selections as one or more selectable buttons, wherein every selectable button is representative of a level that is at or above the compliance minimum for each light source.

8. The lighting system of claim 1, wherein the one or more characteristics of each light source comprise a brightness, a color, an intensity, a flash pattern, an operating mode, or a combination thereof.

9. The lighting system of claim 1, wherein the compliance data comprises a color range, a brightness range, a flash pattern data, an operating mode data, an intensity range, or a combination thereof.

10. The lighting system of claim 1, wherein the location data comprises a zone of an emergency vehicle where each light source of the plurality of light sources is located.

11. The lighting system of claim 10, wherein the location data further comprises a sub-zone of the emergency vehicle where each light source of the plurality of light sources is located.

12. The lighting system of claim 1, wherein the compliance standard includes a National Fire Protection Association (NFPA) regulation.

13. The lighting system of claim 1, wherein the lighting system further comprises a global positioning sensor (GPS), and wherein the processor is further configured to:
   communicate with the GPS to determine a location of the emergency vehicle; and
   determine the compliance standard based on the location of the emergency vehicle.

14. A method of operating a lighting system, the method comprising:
   transmitting one or more compliance data and one or more location data from each light source of one or more light sources on an emergency vehicle,
   comparing the compliance data and the location data with a compliance standard;
   determining a compliance minimum for one or more characteristics for each light source of the one or more light source; and
   adjusting the one or more characteristics of each light source of the plurality of light sources based on one or more user commands, wherein each light source of the plurality of light sources operates at or above the compliance minimum for each light source.

15. The method of claim 14, further comprising:
   determining a compliance list, wherein the compliance list corresponds to a characteristic of the one or more characteristics for each light source, and
   restricting user selections based on the compliance list.

16. The method of claim 14, further comprising accepting the one or more user commands as inputs at a user interface.

17. The method of claim 16, further comprising rendering one or more user selections representative of a characteristic of a light source that is not at or above the compliance minimum and at or below the compliance maximum for each light source as unselect-able.

18. The method of claim 14, adjusting one or more user selections based on the compliance minimum for each light source of the one or more light sources; and
   displaying the user selections as one or more selectable buttons, wherein every selectable button is representative of a level that is at or above the compliance minimum for each light source.

19. The method of claim 14, further comprising communicating with a global positioning sensor (GPS) to determine a location of the emergency vehicle; and
   determining the compliance standard based on the location of the emergency vehicle.

20. The method of claim 14, further comprising:
   determining whether one or more light source is an inoperable light source, and
   when one or more light source is determined to be an inoperable light source, adjusting one or more characteristics of remaining light sources of the one or more light sources to compensate for the inoperable light source.

* * * * *